July 16, 1946.　　　W. P. McCALLICK　　　2,404,310
RAILWAY CAR WHEEL TRUCK
Filed April 10, 1945　　　2 Sheets-Sheet 1

Inventor
William P. McCallick,

By Clarence A. O'Brien
and Harvey B. Jacobson
Attorneys

July 16, 1946.  W. P. McCALLICK  2,404,310
RAILWAY CAR WHEEL TRUCK
Filed April 10, 1945  2 Sheets—Sheet 2

Inventor
William P. McCallick,
By Clarence A. O'Brien
and Harvey B. Jacobson
Attorneys Patented July 16, 1946

2,404,310

UNITED STATES PATENT OFFICE 2,404,310

RAILWAY CAR WHEEL TRUCK

William P. McCallick, El Paso, Tex., assignor of fifteen per cent to Raul M. Ruiz, El Paso, Tex.

Application April 10, 1945, Serial No. 587,476

5 Claims. (Cl. 214—65.4)

This invention relates to railway rolling stock and has for its object to provide a one man device for handling and moving railway car wheels.

Another object of the invention is to provide a truck having means for picking up a car wheel.

A further object of the invention is to provide a wheeled lever having a tongue for projecting through the hub of a car wheel and a plate upon which the tongue is adapted to place the wheel.

Other features and advantages will become more readily apparent from the following description and the accompanying illustrative drawings in which.

Figure 1:
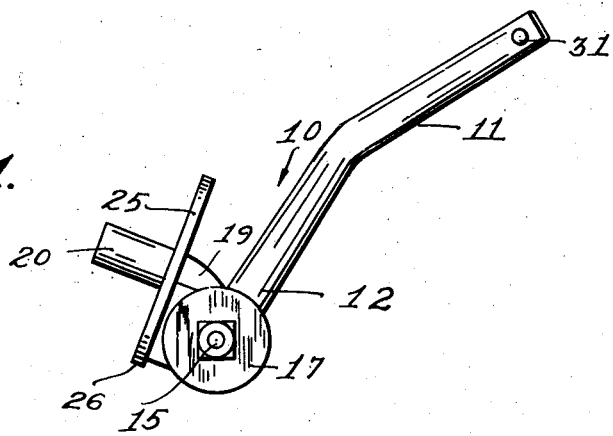
Figure 1 is an elevational view of my truck.
Figure 2:
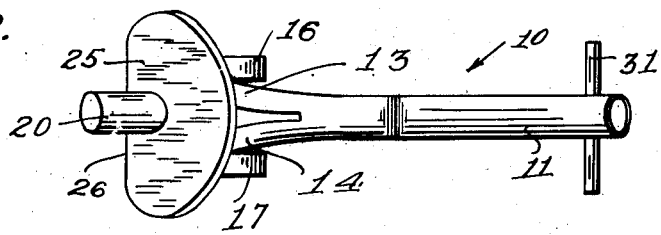
Figure 2 is a similar view shown in changed position.
Figure 3:
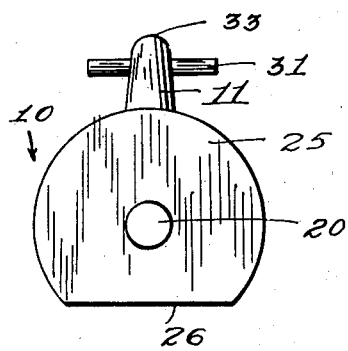
Figure 3 is an end elevation of the truck.
Figure 4:
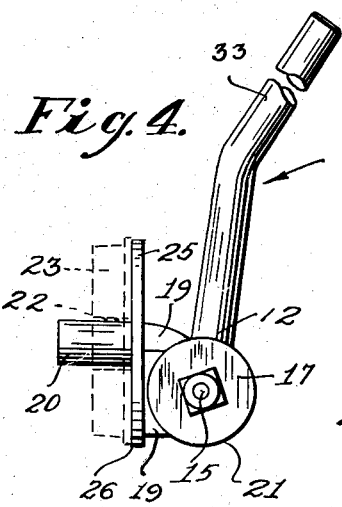
Figures 4 and 5 are elevational views illustrating the application of the invention.
Figure 5:
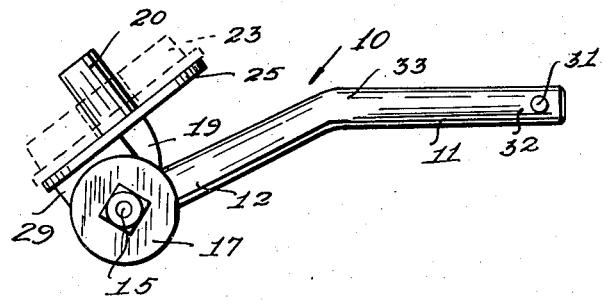
Figure 6:
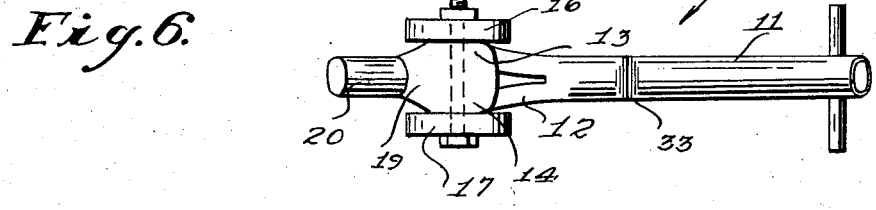
Figure 6 is a plan view, one member removed.
Figure 7:
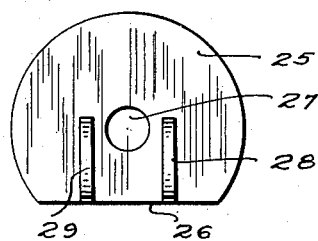
Figure 7 is a detail rear view of a supporting plate.
Figure 8:
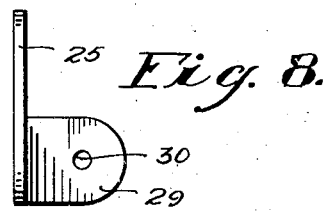
Figure 8 is an edge view thereof.

In the accompanying drawings as above enumerated and in the following specification, like characters of reference indicate like parts throughout and in which 10, indicates my car wheel truck, which consists of a tubular lever 11, which at its lower end 12, is split and spread to form opposing bearings 13 and 14, for supporting a shaft 15, upon which is mounted wheels 16 and 17. The lower end of the tube 12 adjacent the bearings 13 and 14 is bent back upon itself and is then bent out at right-angles as at 20, at substantially the same distance from the tread 21, of the wheels 16 and 17, as is the distance from the tread 22, of a car wheel 23, to its hub opening 24 (shown dotted in Figure 4 of the drawings). A disk like plate 25, having its lower end 26, squared off, and a central opening 27, is provided with right-angularly disposed bearing members 28 and 29, projecting from the opposite sides of the said opening on the rear surface thereof, is through bores 30, mounted upon said shaft 15, inwardly of the wheels 16 and 17, the tongue or terminal 20, of said lever 11, projecting through the opening 27, in said member 25, whereby the truck may be wheeled to the face of a car wheel and its tongue 20, projected through the hub of the wheel, then upon bearing down upon the handle bar 31, at the terminal 32, of the member 11, the truck may be easily rotated upon its axle 15, to raise the tongue 20, lifting the car wheel 23, therewith and shifting its inward to seat upon the disk plate 25, whereupon its may be easily transported to the place where rolling stock is being assembled. Due to the weight of car wheels, it ordinarily takes two or more men to handle them, but with my above described truck I find that job can very easily and expeditiously be done by one man. When it is understood that in the manufacture of car wheels they are lined up in storage space face to face upon the rims, therefore it will readily be seen that with my truck they may be easily picked up by the truck and moved to where needed. Due to the straight edge 26, of disk 25, the truck may be stood in vertical position and due to the bend 33, in the member 11, the handle bar 31, is somewhat lowered and to which pressure may be now applied.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. A truck for handling car wheels consisting of a lever having its lower end bent and turned toward itself, said bend forming a fulcrum support, a shaft carried by the support and forming said fulcrum, wheels on said shaft and a wheel bearing plate supported on said shaft, said turned portion forming an outwardly extending tongue, adapted to fit and project into the hub of the wheel, and said plate being substantially the diameter of a car wheel and provided with a straight lower edge.

2. A truck for handling car wheels consisting of a lever having its lower end bent and turned toward itself, said bend forming a fulcrum support, a shaft carried by the support and forming said fulcrum, wheels on said shaft and a wheel bearing plate supported on said shaft, said turned portion forming an outwardly extending tongue adapted to fit and project into the hub of the wheel.

3. A truck for handling car wheels consisting of a lever having its lower end bent and turned toward itself, said bend forming a fulcrum support, a shaft carried by the support and forming said fulcrum, wheels on said shaft and a wheel bearing plate supported on said shaft, and said turned portion forming an outwardly extending tongue.

4. A lever having one end bent upon itself, then turned out to form a lift, wheels for supporting the same, and a plate having three point suspension mounted on the lift adapted to receive and hold a car wheel in vertical position.

5. A truck for handling car wheels comprising a lever having its lower end bent and turned toward itself to form a shaft bearing, a shaft mounted transversely in said bearing, the lower end of said lever being bent outwardly at right angles, a wheel bearing plate being apertured to extend over said right angle extension and having spaced apertured supporting brackets adapted to be positioned over the opposite ends of said shaft, and wheels on the ends of said shaft.

WILLIAM P. McCALLICK.